US012118343B2

United States Patent
Featherstone

(10) Patent No.: US 12,118,343 B2
(45) Date of Patent: Oct. 15, 2024

(54) METHOD AND APPARATUS FOR MULTI-ACCESS EDGE COMPUTING IN A WIRELESS COMMUNICATION SYSTEM

(71) Applicant: Samsung Electronics Co., Ltd., Suwon-si (KR)

(72) Inventor: Walter Featherstone, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 86 days.

(21) Appl. No.: 17/773,757

(22) PCT Filed: Nov. 4, 2020

(86) PCT No.: PCT/KR2020/015309
§ 371 (c)(1),
(2) Date: May 2, 2022

(87) PCT Pub. No.: WO2021/091220
PCT Pub. Date: May 14, 2021

(65) Prior Publication Data
US 2022/0405084 A1    Dec. 22, 2022

(30) Foreign Application Priority Data

Nov. 5, 2019 (GB) .................................. 1916076.1

(51) Int. Cl.
G06F 8/65 (2018.01)
H04W 88/02 (2009.01)

(52) U.S. Cl.
CPC ............... G06F 8/65 (2013.01); H04W 88/02 (2013.01)

(58) Field of Classification Search
CPC .................................. G06F 8/65; H04W 88/02
(Continued)

(56) References Cited

U.S. PATENT DOCUMENTS 6,990,087 B2 *    1/2006    Rao .......................... H04L 47/11
                                                                370/347
9,672,338 B1 *    6/2017    Kim ......................... G06F 21/10
(Continued)

FOREIGN PATENT DOCUMENTS

| WO | 2017/052683 A1 | 3/2017 |
| WO | 2017/176329 A1 | 10/2017 |
| WO | 2019/104280 A1 | 5/2019 |

OTHER PUBLICATIONS

Du et al, "Big Data Privacy Preserving in Multi-Access Edge Computing for Heterogeneous Internet of Things", IEEE, pp. 62-67 (Year: 2018).*

(Continued)

*Primary Examiner* — Anil Khatri
(74) *Attorney, Agent, or Firm* — Jefferson IP Law, LLP

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. Disclosed is a method of creating or updating an application context in a Multi-access Edge Computing, MEC, system, comprising the steps of: a) a device application posting a request to the MEC system to create or update the application context and to specify desired application location constraints; b) the MEC system authorising the request and creating or updating the application context in the MEC system and informing the device application (Continued)

accordingly; and c) the MEC system detecting a change in application location availability.

18 Claims, 7 Drawing Sheets

(58) Field of Classification Search
USPC .................................................. 717/168–178
See application file for complete search history.

(56) References Cited

U.S. PATENT DOCUMENTS

| | | | |
|---|---|---|---|
| 10,484,848 B2 | 11/2019 | Cavalcanti et al. | |
| 11,159,449 B1* | 10/2021 | Nishimura | H04L 67/61 |
| 11,196,680 B1* | 12/2021 | Caceres | H04L 47/70 |
| 11,395,195 B2* | 7/2022 | Mishra | H04L 67/34 |
| 11,445,039 B2* | 9/2022 | Yoon | H04L 67/51 |
| 11,552,900 B2* | 1/2023 | Trang | H04L 47/803 |
| 11,564,159 B2* | 1/2023 | Kwok | H04W 48/18 |
| 11,640,292 B2* | 5/2023 | Ward | H04W 4/70 |
| | | | 717/173 |
| 11,676,576 B2* | 6/2023 | Al Bawab | G10L 15/183 |
| | | | 704/231 |
| 11,689,640 B2* | 6/2023 | Roth | H04W 4/02 |
| | | | 709/203 |
| 11,743,325 B1* | 8/2023 | Dunsmore | G06F 9/505 |
| | | | 709/203 |
| 11,765,126 B2* | 9/2023 | Roy | H04L 67/12 |
| | | | 709/245 |
| 11,909,845 B2* | 2/2024 | Shim | H04L 63/1408 |
| 2019/0104030 A1* | 4/2019 | Giust | H04L 41/0893 |
| 2019/0141610 A1* | 5/2019 | Sabella | G06F 9/45533 |

OTHER PUBLICATIONS

Taleb et al, "On Multi-Access Edge Computing: A Survey of the Emerging 5G Network Edge Cloud Architecture and Orchestration", IEEE, pp. 1657-1681 (Year: 2017).*

Ranaweera et al, "Survey on Multi-Access Edge Computing Security and Privacy", IEEE, pp. 1078-1124 (Year: 2021).*

Lyu et al, "Multi-leader Multi-follower Stackelberg Game based Resource Allocation in Multi-access Edge Computing", IEEE, pp. 4306-4311 (Year: 2022).*

Hou et al, "Multi-layer Access Control Mechanism based on Blockchain for Mobile Edge Computing", IEEE, pp. 285-291 (Year: 2020).*

Meng et al, "Deep Reinforcement Learning Based Delay-Sensitive Task Scheduling and Resource Management Algorithm for Multi-User Mobile-Edge Computing Systems", ACM, pp. 66-70 (Year: 2019).*

Liu et al, "Toward Edge Intelligence: Multiaccess Edge Computing for 5G and Internet of Things", IEEE, pp. 6722-6742 (Year: 2020).*

Multi-access Edge Computing (MEC); UE application interface, ETSI GS MEC 016 V2.1.1, Apr. 5, 2019.

ETSI Draft Specification, European Telecommunications Standards Institute, vol. ISG MEC 016 V2.2.1, 2019, Multi-access Edge Computing (MEC); Device application interface, pp. 1-23, Apr. 2020.

ETSI Group Specification, European Telecommunications Standards Institute, vol. MEC 003 V2.1.1, 2019, Multi-access Edge Computing (MEC); Framework and Reference Architecture, pp. 1-21, Dec. 18, 2012.

Huawei Tech, France; China Telecommunications, MEC016 Location constraints and multiple application URIs per application context, MEC(19)000417r1, Oct. 16, 2019.

3rd Generation Partnership Project; Technical Specification Group Services and System Aspects; Study on application architecture for enabling Edge Applications; (Release 17), 3GPP TR 23.758 V17.0.0 (Dec. 2019), Dec. 19, 2019.

ETSI GS MEC 016 V2.1.1 (Apr. 2019) Multi-access Edge Computing (MEC); UE application interface, Apr. 2019.

International Search Report dated Feb. 23, 2021, issued in International Application No. PCT/KR2020/015309.

British Search Report dated Aug. 18, 2020, issued in British Application No. GB1916076.1.

Extended European Search Report dated Oct. 20, 2022, issued in European Application No. 20885248.3-1213.

* cited by examiner

METHOD AND APPARATUS FOR MULTI-ACCESS EDGE COMPUTING IN A WIRELESS COMMUNICATION SYSTEM

TECHNICAL FIELD

The present invention relates to Multi-access Edge Computing (MEC). It particularly relates to location based issues in connection with deploying a new application in a MEC system.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

MEC systems are known in the art and are typically provided to offer consumers an improved performance by physically locating certain resources at the edge of the network i.e. remote from the central core or internet, but close to the consumer.

DISCLOSURE OF INVENTION

Technical Problem

It is possible for the device application to request a set of geographic regions in which to make a MEC application available. The MEC system will respond with an application context, which includes the set of geographic regions (if any) in which the MEC application is available.

There are, however some limitations with the current implementation. Firstly, there is no mechanism through which the device application is able to determine the candidate list of available locations, which means it is not able to make an informed decision when requesting the set of geographic regions in which to make a MEC application available. Secondly, there is no procedure defined to provide updates on location availability, e.g. to inform the device application that a location has become available, or is now unavailable. Thirdly, there is no mechanism defined to allow the device application to indicate its preferences to the MEC system should the location availability change, e.g. automatically instantiate a new application instance if a desired location becomes available, or delete all instances should a location become unavailable.

These limitations are undesirable and limit the effectiveness of the MEC system. It is an aim of embodiments of the present invention to address such limitations and others whether mentioned herein or not.

Solution to Problem

According to the present invention there is provided an apparatus and method as set forth in the appended claims. Other features of the invention will be apparent from the dependent claims, and the description which follows.

According to a first aspect of the present invention, there is provided a method of creating or updating an application context in a Multi-access Edge Computing, MEC, system, comprising the steps of:
  a) a device application posting a request to the MEC system to create or update the application context and to specify desired application location constraints;
  b) the MEC system authorising the request and creating or updating the application context in the MEC system and informing the device application accordingly; and
  c) the MEC system detecting a change in application location availability.

In an embodiment, if at step c), a change in application location availability is detected, which removes the only available location, then the device application is informed that the application context is deleted.

In an embodiment, at step a), the device application additionally requests to be updated by the MEC system if an application location constraint changes.

In an embodiment, at step c) the MEC system detecting a change in the location availability comprises determining that a new location is available, wherein the new location was specified in step a) but was not available at that time.

In an embodiment, step c) comprises informing the device application of an updated list of application location constraints.

In an embodiment, at step a), the device application additionally requests that a new application instance is created if a requested location is unavailable but later becomes available.

In an embodiment, if step c) determines that the change in location availability includes the requested location becoming available, then the MEC system updates the application context to include the new location.

According to a second aspect of the present invention, there is provided a discovery process for use in a MEC system comprising the steps of:
- a device application posting a request to the MEC system including details of a particular location in which it is desired to make an application available to application consumers; and
- the MEC system determining if the particular location is available and informing the device application accordingly.

In an embodiment, the step of the device application posting a request comprises a subscription request whereby the device application requests to be informed in the future if the particular location becomes available.

In an embodiment, the subscription request is time-limited.

According to a third aspect of the present invention, there is provided a MEC system operable to be sensitive to changes in application location constraints and to either inform a device application accordingly or to update an existing application context accordingly.

Advantageous Effects of Invention

Embodiments of the present invention offer advantages over the prior art. These advantages include allowing the determination of a candidate list of available locations for application instantiation, allowing it to make an informed decision when requesting the set of geographic regions in which to make a MEC application available.

Further, the developer is able to receive updates on application placement location availability, e.g. to inform the device application that a location has become available, or is now unavailable.

Further, the developer is able to receive updates on application instance availability, e.g. to inform the device application that a specific application instance from with the overall application context has been deleted from the MEC system should a location become unavailable.

Further, the developer is able to provide an indication to the MEC system on its application instantiation preferences should the location availability change, e.g. request automatic instantiation of a new application instance if a desired location becomes available.

BRIEF DESCRIPTION OF DRAWINGS

For a better understanding of the invention, and to show how embodiments of the same may be carried into effect, reference will now be made, by way of example only, to the accompanying diagrammatic drawings in which.

MODE FOR THE INVENTION

Figure 1:
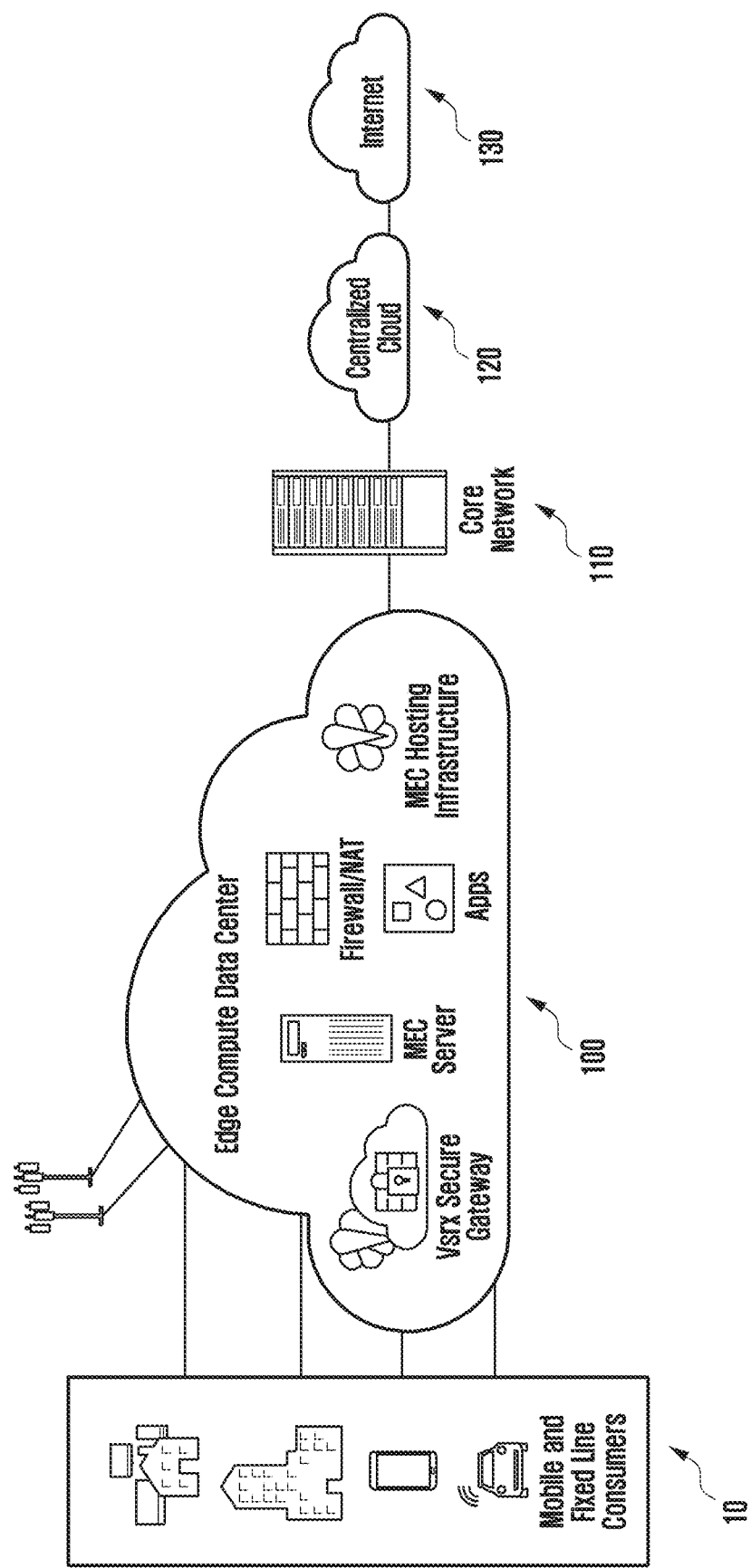
FIG. 1 illustrates a typical MEC system.

FIG. 1 illustrates a typical MEC system (100) and how it relates to other entities in the system. A plurality of user types (10) are able to connect to the MEC system (100). Such users (10) can access the MEC system (100) via fixed wire schemes, WiFi or cellular technologies, such as LTE or 5G, for instance.

The MEC system (100) comprises various further entities, including locally hosted applications (apps) and if the user (10) requests access to such an app, then the MEC system (100) is able to provide access to the user without recourse to any remote server or resource.

Such remote resources may, if needed, be access via core network (110) which is able to utilise resources in a centralised cloud (120) and/or the internet (130).

MEC systems (100) are necessarily localised and the availability of a particular resource to a user depends where that user is located and to which MEC it has access.

As a simple example, a user located in a first city who wishes to access a restaurant review application via MEC may only be able to see restaurants in the vicinity of the MEC system's location, whereas a user located in a different city would not be able to access the same app, since it is not available in that user's local MEC.

If an application developer wishes to make an application available in a MEC, then this is currently performed by means of Mx2 reference point between the device application in the User Equipment (UE) and the User Application LifeCycle Management Proxy (UALCMP) in the MEC system. This interface allows an MEC application developer to directly interact with the MEC system using a device with a client that supports the Mx2 API. This client is known as a device application in MEC terminology. Currently, such a device application is able to request the following MEC application lifecycle management operations from the MEC system: query the available application instances, request application instantiation and update/delete an existing application instance context. MEC applications instantiated in this manner are referred to as "user applications".

In the foregoing and throughout this application, reference is made to terms which are specified according to ETSI ISG MEC standards. The skilled person will readily appreciate that other forms of MEC are available and the terms used herein are exemplary only and not intended to be limiting.

In the following, The UALCMP is considered as the gateway to the MEC system and so, according to the context, reference to UALCMP and MEC system may be used interchangeably.

Throughout this application, reference is made to either creating or updating an application context. The skilled person will appreciate that creation of an application context implies that no application context existed prior to the creation. Updating an application context implies that an existing application context is updated, primarily in this case in the light of changes in application location constraints.

As stated above, there is no mechanism provided by the ETSI MEC UE Application (Mx2) Interface to ensure a device application wishing to perform application lifecycle management operations (e.g. user (MEC) application context creation) is aware of the MEC system's location constraints for such applications. Such location constraints may change quite dynamically as edge deployments are rolled out, and new MEC systems are deployed and/or existing MEC systems are upgraded. Further, even once rolled out, based on current edge hosting environment capacity, the situation can change e.g. by other application deployments.

This is particularly important due to the potential resource constraints at the edge, especially when compared to a cloud hosting environment, where additional resources can be more easily deployed, since these are typically deployed at a central location, shared by many distant users.

According to the prior art, a device application may request an application context to be created with a given set of location constraints, but there is no feedback mechanism for the MEC system to provide insight into the available locations (e.g. the service area(s) for an edge deployment), or whether an application context has had to be deleted from the system as a result of changes to the location availability. This creates the problems referred to above.

According to the present invention, there is provided a mechanism to ensure a device application wishing to perform application lifecycle management operations is aware of the MEC system's location constraints for such applications. This is achieved by enhancing the existing application context create procedure through additions to the exchanged data types (e.g. supporting requests to receive notification relating to changes in location availability and for automatic creation of new application instances should new service areas covering the desired locations become available), as well as providing additional notifications to the device application pertinent to the current state of the MEC system (e.g. changes in availability of service locations, deletion of specific application instances). Embodiments of the invention also introduce a procedure to allow the device application to directly query what the location constraints are for a specific application.

Figure 2:
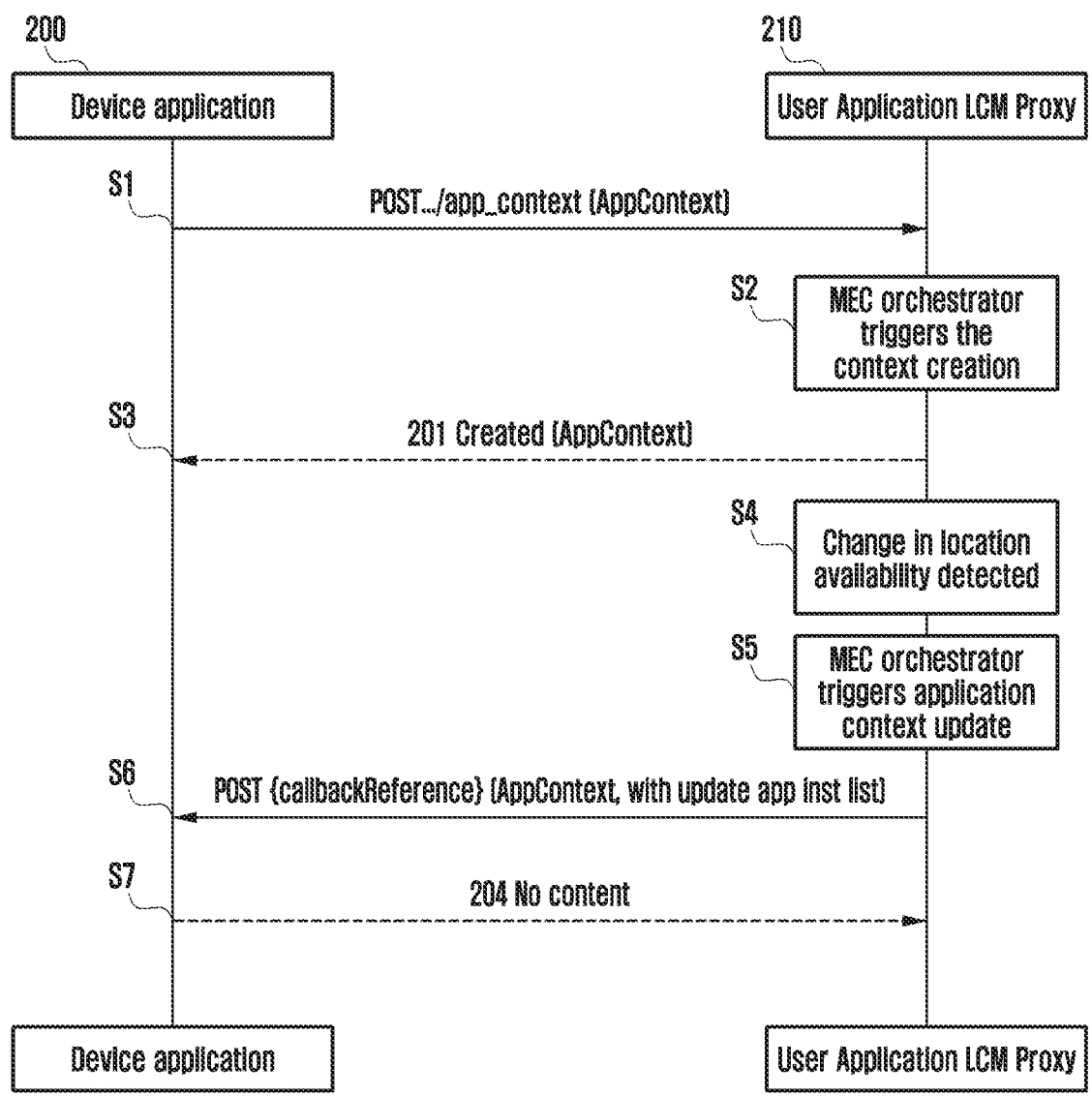
FIG. 2 illustrates a message exchange according to an embodiment of the present invention.

FIG. 2 illustrates a message flow according to an embodiment of the present invention. This illustrates the "application context create" process in the form of messages exchanged between the Device Application (200) and the UALCMP (210). The application context create is the procedure to request either to join with an available user application or to instantiate a new user application.

As part of the user application instantiation, the MEC system creates an associated application context that the MEC system maintains for the lifetime of the user application. The application context contains information specific to the application instance(s) such as its unique identifier within the MEC system and the location constraints and the address(es) (URI) provided for clients that are external to the MEC system to interact with the user application.

The Message flow in FIG. 2 comprises a number of discrete steps and/or actions, which are set out below:
(S1) The device application (200) submits a message to the UALCMP (210). This may be in the form of a POST, according to HTTP, or any other suitable means. The message body contains the data structure for the application context to be created, which includes the desired application location constraints.
(S2) The UALCMP (210) authorizes the request from the device application (200). The request is forwarded to the operational support system (OSS). The OSS makes the decision on granting the applications context creation request. An MEC orchestrator (present in MEC system (100) in FIG. 1) triggers the creation of the application context in the MEC system, with its associated applications instances.
(S3) The UALCMP (210) returns the "201 Created" response to the device application (200) with the message body containing the data structure of the created application context. The context includes the address (es) (reference URI) provided for clients that are external to the MEC system to interact with the user application, as well as the applied location constraints. The response message header contains the address of the resource relating to the application instance context created and maintained by the MEC system (210).
(S4) The MEC system is made aware of changes in location availability for the user application, in particular that a location constraint can no longer be fulfilled since the location is no longer available.
(S5) The MEC system triggers the update of the application context, since an application instance will have been removed. If that was the only application instance, indication that the application context has been deleted from the MEC system will be provided to the device application.
(S6) The UALCMP (210) sends a POST message to the callback reference address (notification endpoint) provided by the device application as part of application context creation, with the message body containing the updated application context.
(S7) The device application returns a "204 No Content" response to acknowledge successful reception of the message from step S1.

By means of the above process, the Device Application (200) is kept informed of changes in the location availability relating to the application context which has been previously notified via step S1.

Figure 3:
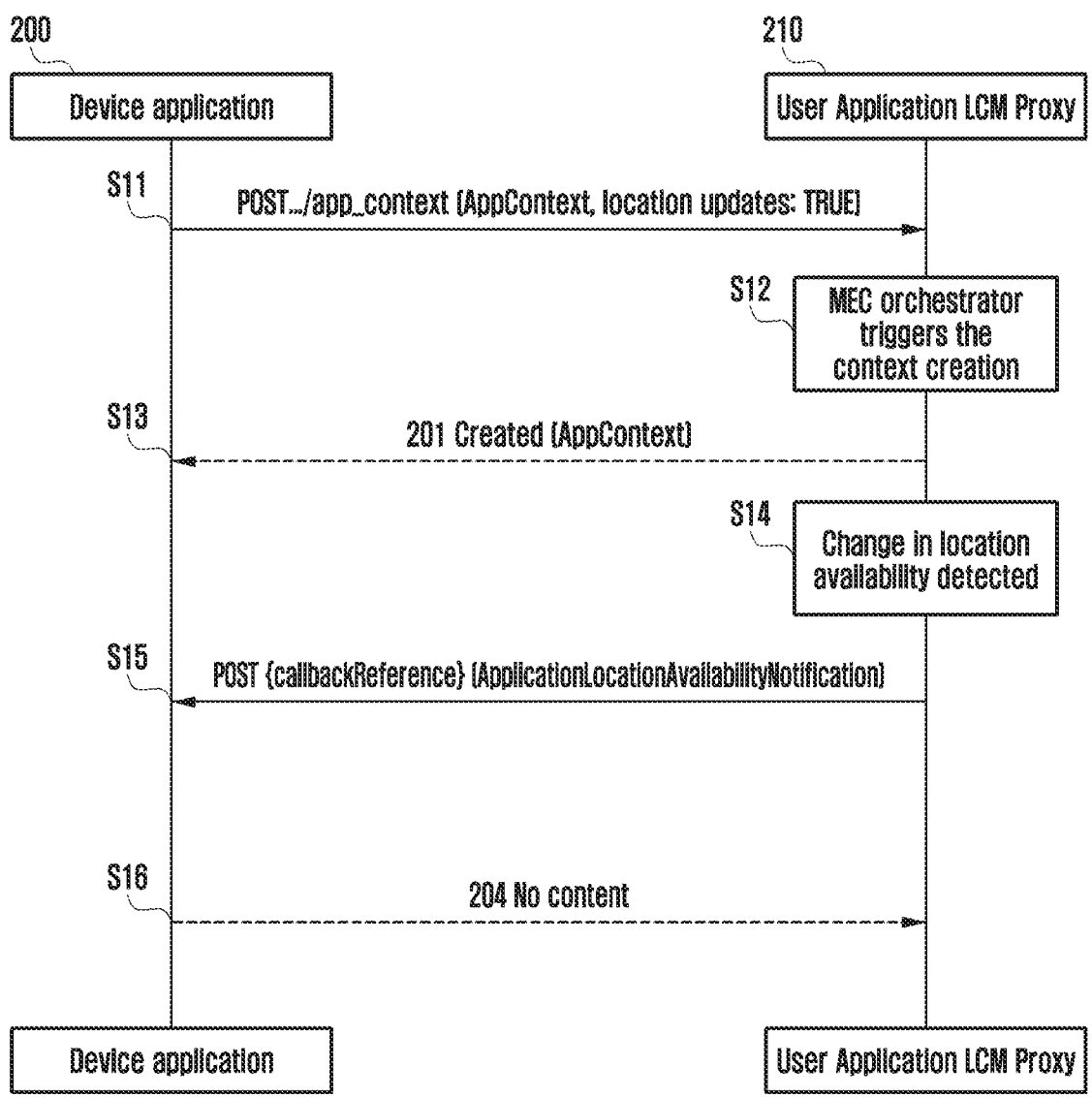
FIG. 3 illustrates a message exchange according to an embodiment of the present invention.

FIG. 3 illustrates a message flow according to a further embodiment of the present invention. In this case, the application context is created with a request for location update.

The Message flow in FIG. 3 comprises a number of discrete steps and/or actions, which are set out below:
(S11) The device application (200) submits a POST request to the UALCMP (210). The message body contains the data structure for the application context to be created, including the required application location constraints and optionally a flag requesting subscription to notifications relating to changes in the application location constraints. By means of this flag, the device application is able to control what the MEC system does in certain circumstances, which differs from the embodiment shown in FIG. 2, above.

Steps S12 & S13 are the same as steps S2 and S3 referred to above.
(S14) The MEC system is made aware of changes in location availability for the user application, in particular that an unfilled location constraint made in the application context create request could now be fulfilled since the location is now available. In other words, at step S11, if the device application (200) informs the MEC system (210) that it would like to have the application instantiated at a certain location, but that was not possible at the time, but that certain location becomes available at a later time, the MEC system (210) informs the device application (200) in the follow step (S15).

(S15) The UALCMP (210) sends a POST message to the callback reference address provided by the device application as part of application context creation, with the message body containing the location availability update notification data type (ApplicationLocation-AvailabilityNotification), indicating the list of location constraints.

The ApplicationLocationAvailabilityNotification data structure is very similar to the AppContext data type, but excluding attributes such as contextId and appinstanceId & referenceURI within the userAppInstanceInfo attribute.

(S16) The device application returns a "204 No Content" response to acknowledge successful reception of the message of step S11.

By means of this embodiment, even if a desired location is not available at the outset, the device application can be informed of it becoming available in the future, if the appropriate flag is set at step S11. Alternatively, the setting of the flag can be a default position whereby the MEC system sends the updates of step S15 in all cases.

If informed of a change in application location constraints by means of the message sent at step S15, the developer may choose to update the existing application context and to do this, the process illustrated in FIG. 2 may be used.

Figure 4:
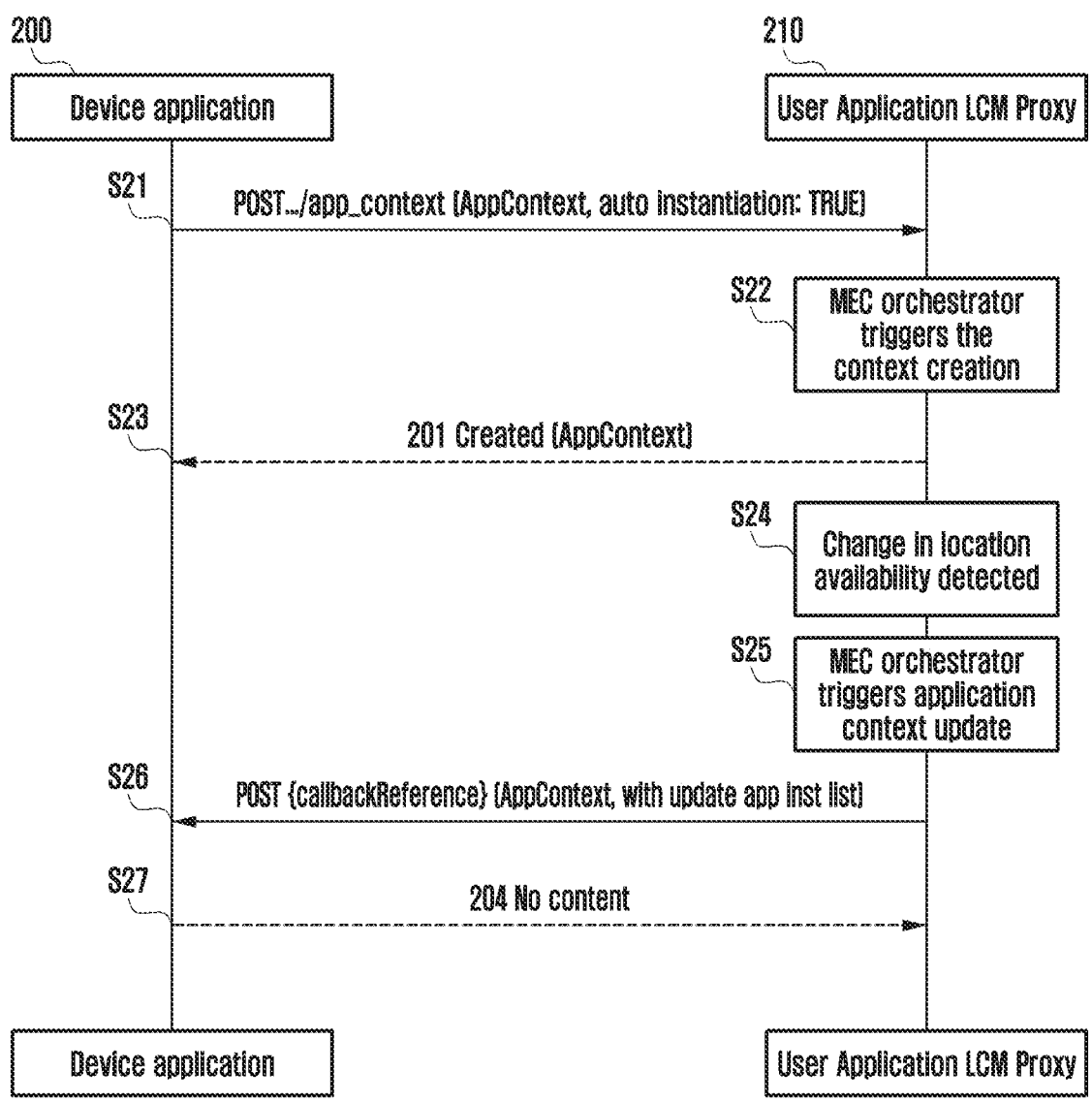
FIG. 4 illustrates a message exchange according to an embodiment of the present invention.

FIG. 4 illustrates a message flow according to a further embodiment of the present invention. In this case, the application context is created with a request for automatic instantiation of new instances of the application in certain circumstances.

The Message flow in FIG. 4 comprises a number of discrete steps and/or actions, which are set out below:

(S21) The device application (200) submits the POST request to the UALCMP (210). The message body contains the data structure for the application context to be created, including the application location constraints and optionally a flag requesting that new application instances should be created should it become possible to fulfil a location constraint that couldn't be fulfilled when the original application context create was made. In other words, if a location which is originally identified is unavailable at that time, but becomes available at a later date, the application can be automatically instantiated at that later time without any further input from the application developer.

Steps S22 & S23 are the same as steps S2 and S3 referred to above.

(S24) The MEC system is made aware of changes in location availability for the user application, in particular that an unfilled location constraint made in the application context create request could now be fulfilled since the location is now available. The change in availability may be a long-term change in the sense that a brand new location is made available, or it may be a transient change in the sense that due to system conditions, a previously available location is unavailable for a time but then becomes available again.

(S25) The MEC system triggers the update of the application context in the MEC system, since an application instance will have been added (or removed). In the case of removal, if that was the only application instance, indication that the application context has been deleted will be provided.

(S26) The UALCMP sends a POST message to the callback reference address provided by the device application as part of application context creation, with the message body containing the updated application context. This informs the device application that the application has been instantiated at a new location, but the developer does not need to take any action.

(S27) The device application returns a "204 No Content" response to acknowledge successful reception of the message of step S21.

An advantage of the embodiment shown in FIG. 4 is that a developer is able to specify at the outset that the application is to, preferably, be instantiated at one or more locations and if one of those one or more locations is unavailable at that time, but becomes available later, the application is automatically instantiated at the new location. The developer is informed, as shown in step S26, but to explicit action is required by the developer.

Figure 5:
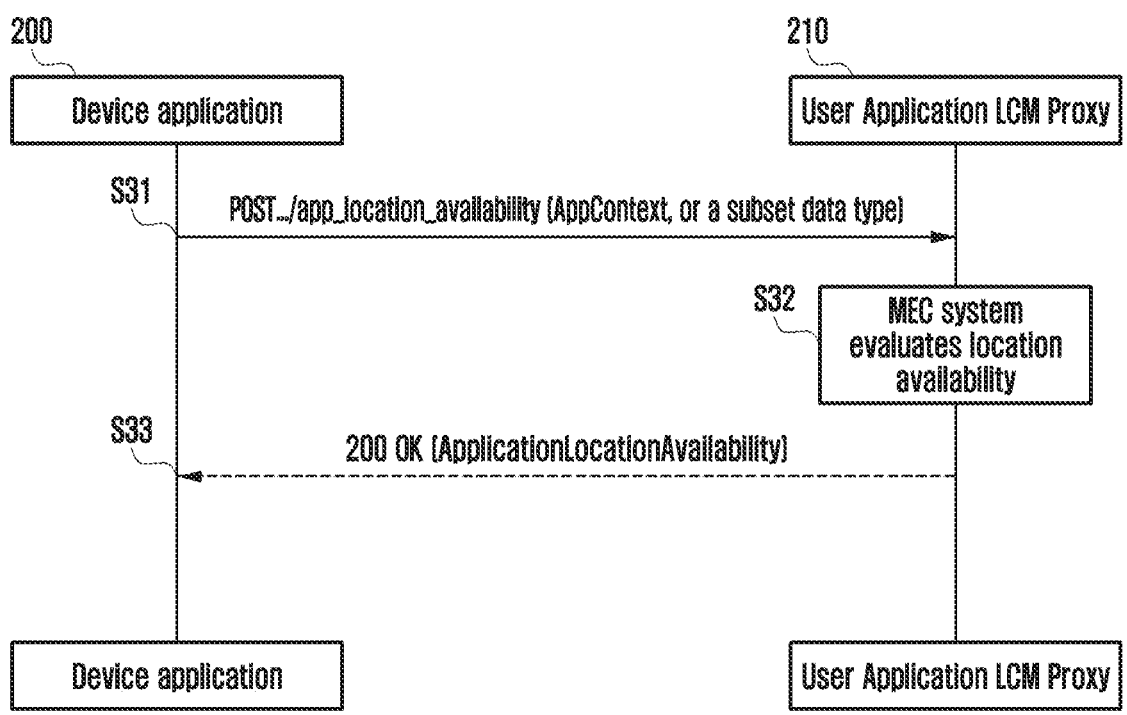
FIG. 5 illustrates a message exchange according to an embodiment of the present invention.

FIG. 5 illustrates a message flow according to an embodiment of the present invention. This embodiment relates to constraint look-up in advance of attempting to instantiate a particular app. In the prior art, it is not possible to query the MEC system in advance of attempting to instantiate an app. The embodiment of FIG. 5 addresses this issue.

The location constraint look-up process of FIG. 5 is a procedure for a device application (200) to request a list of locations that are available for instantiation of a specific user application in the MEC system (210). The decision on whether a particular location is available given a defined location constraint may be based on factors such as whether there is an edge data network (EDN) associated with the area defined by the location constraint. Then, even if there is EDN, a decision on whether it has sufficient resource to support the deployment of the application instance (based on the characteristics, e.g. resource requirements, and QoS demands, e.g. latency) is required. It should be noted that the QoS demands may not be a factor in whether an application may be instantiated within a particular constrained location but are likely to be important in practice in determining whether an application client in the UE is permitted to connect to a specific application instance.

The Message flow in FIG. 5 comprises a number of discrete steps and/or actions, which are set out below:

(S31) The device application (200) submits a POST request to the UALCMP (210). The message body contains the data structure pertinent to the user application and the desired location constraints.

If a callbackReference address is provided, the device application (200) may be notified about changes in location availability, if required. This would require a subscription expiry time. This is not currently specifies in the MEC system, but may be implemented if required.

(S32) The UALCMP (210) authorizes the request from device application (200). The MEC system then evaluates the list of candidate locations for user application instantiation available to the requesting device application.

(S33) The UALCMP (210) returns the 200 OK response to the device application (200), with the message body (ApplicationLocationAvailability) containing the data structure for the list of available constrained locations for the user application.

The ApplicationLocationAvailability data structure is very similar to the AppContext data type, but excluding attributes such as contextId and appinstanceId & referenceURI within the userAppinstanceInfo attribute, since these are not relevant to a query of this sort and apply to an actually instantiated app.

By means of the embodiment of FIG. 5, an application developer is able to query the MEC system (210) in advance to enquire about the availability of resources in a specific location. As such, it acts as a "discovery" process, enabling decision about location to be made in advance of attempted instantiation, saving time and allowing a better planned rollout of an app.

The following Table 1 gives definitions of AppContext data types, which represents the information on application context created by the MEC system. The underlined entries relate to embodiments presented herein.

TABLE 1

| Attribute name | Data type | Cardinality | Description |
|---|---|---|---|
| contextId | String | 0 . . . 1 | Uniquely identifies the application context in the MEC system. Assigned by the MEC system and shall be present other than in a create request. The length of the value shall not exceed 32 characters. |
| associateUeAppId | String | 1 | Uniquely identifies the device application. The length of the value shall not exceed 32 characters. |
| callbackReference | URI | 0 . . . 1 | URI assigned by the device application to receive application lifecycle related notifications. Inclusion in the request implies the client supports the pub/sub mechanism and is capable of receiving notifications. This endpoint shall be maintained for the lifetime of the application context. |
| appLocationUpdates | Boolean | 0 . . . 1 | Used by the device application to request to receive notifications at the callbackReference URI relating to location availability for user application instantiation |
| appAutoInstantiation | Boolean | 0 . . . 1 | Provides indication to the MEC system that instantiation of the requested application is desired should a requested appLocation become available that wasn't at the time of the request. |
| appInfo | Structure (inlined) | 1 | |
| >appDId | String | 0 . . . 1 | Identifier of this MEC application descriptor. This attribute shall be globally unique. It is equivalent to the appDId defined in clause 6.2.1.2 of ETSI GS MEC 010-2. It shall be present if the application is one in the ApplicationList. |
| >appName | String | 1 | Name of the MEC application. The length of the value shall not exceed 32 characters. |
| >appProvider | String | 1 | Provider of the MEC application. The length of the value shall not exceed 32 characters. |
| >appSoftVersion | String | 0 . . . 1 | Software version of the MEC application. The length of the value shall not exceed 32 characters. |
| >appDVersion | String | 1 | Identifies the version of the application descriptor. It is equivalent to the appDVersion defined in clause 6.2.1.2 of ETSI GS MEC 010-2. |
| >appDescription | String | 0 . . . 1 | Human readable description of the MEC application. The length of the value shall not exceed 128 characters. |
| >userAppInstanceInfo | array (Structure inlined) | 1 . . . N | List of user application instance information. |
| >>appInstanceId | String | 0 . . . 1 | Identifier of the user application instance. It shall only be included in the response. |
| >>referenceURI | URI | 0 . . . 1 | Address of the user application instance. It shall only be included in the response. |
| >>appLocation | LocationConstraints | 0 . . . 1 | Location of the user application instance. For an existing user application it shall match one of the appLocations in ApplicationList. |

TABLE 1-continued

| Attribute name | Data type | Cardinality | Description |
|---|---|---|---|
| >appPackageSource | URI | 0 . . . 1 | URI of the application package. Included in the request if the application is not one in the ApplicationList. appPackageSource enables on-boarding of the application package into the MEC system. The application package shall comply with the definitions in clause 6.2.1.2 of ETSI GS MEC 010-2. |

NOTE 1:
If a value of the attribute is included in the request, the same value shall be included in the response.
NOTE 2:
The design of the current operation with callback reference assumes no web proxy between the entity that originates the notification and the entity that receives it.
NOTE 3:
The language support for the application description may be limited.
NOTE 4:
Attribute appLocationUpdates and appAutoInstantiation shall not both be set to TRUE.

The following Table 2 relates to the embodiment of FIG. 5. The LocationConstraints data type supports the specification of MEC application requirements related to MEC application deployment location constraints. The location constraints in the table below are presented as a country code, optionally followed by a civic address based on the format defined by IETF RFC 4776.

TABLE 2

| Attribute name | Data type | Cardinality | Description |
|---|---|---|---|
| countryCode | String | 1 | The two-letter ISO 3166 country code in capital letters. |
| civicAddressElement | array (Structure inlined) | 0 . . . N | Zero or more elements comprising the civic address. |
| >caType | Integer | 1 | Describe the content type of caValue. The value of caType shall comply with section 3.4 of IETF RFC 4776. |
| >caValue | String | 1 | Content of civic address element corresponding to the caType. The format caValue shall comply with section 3.4 of IETF RFC 4776. |

Figure 6:
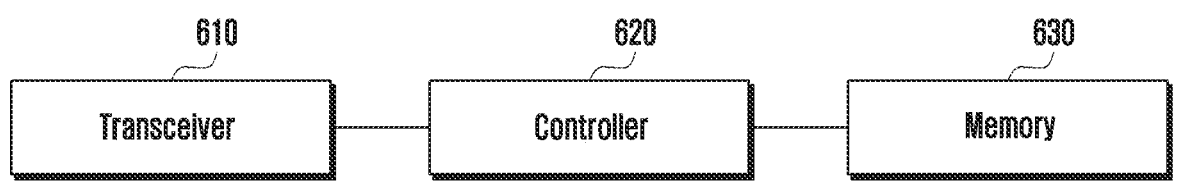
FIG. 6 illustrates a block diagram of a user equipment (UE) according to an embodiment of the present invention.

FIG. 6 illustrates a block diagram of a user equipment (UE) according to an embodiment of the present invention.

Referring to the FIG. 6, the UE may include a transceiver (610), a controller (processor) (610) and a memory (630). However, all of the illustrated components are not essential. The UE may be implemented by more or less components than those illustrated in FIG. 6. In addition, the transceiver (610), the controller (620) and the memory (630) may be implemented as a single chip according to another embodiment.

The transceiver (610) may be connected to the controller (610) and responsible for communication with other network entities. The transceiver (610) may communicate signal with other network entities. The transceiver (610) may be connected to the controller (620) and transmit and/or receive a signal. The signal may include control information, messages, or data.

The controller (620) may include one or more processors or other processing devices that control the proposed function, process, and/or method. Operation of the UE may be implemented by the controller (620).

The memory (630) may store the control information or the data included in a signal obtained by the UE. The memory (630) may be connected to the controller (620) and store at least one instruction or a protocol or a parameter for the proposed function, process, and/or method.

Figure 7:
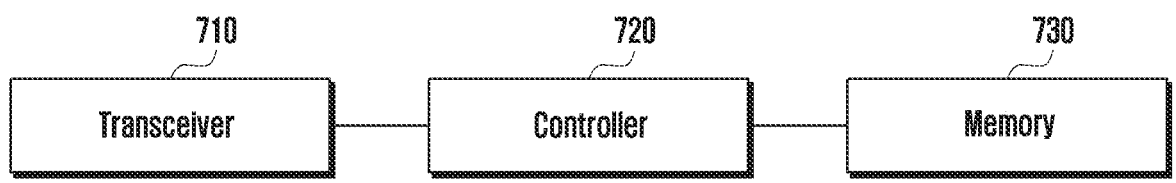
FIG. 7 illustrates a block diagram of a MEC server according to an embodiment of the present invention.

FIG. 7 illustrates a block diagram of a MEC server according to an embodiment of the present invention.

Referring to the FIG. 7, the MEC server may include a transceiver (710), a controller (720), and a memory (730). However, all of the illustrated components are not essential. The MEC server may be implemented by more or less components than those illustrated in FIG. 7. In addition, the transceiver (710), the controller (720) and the memory (730) may be implemented as a single chip according to another embodiment.

The transceiver (710) may be connected to the controller (720) and responsible for communication with other network entities. The transceiver 1810 may communicate signal with other network entities. The transceiver (710) may be connected to the controller (720) and transmit and/or receive a signal. The signal may include control information, messages, or data.

The controller (720) may include one or more processors or other processing devices that control the proposed function, process, and/or method. Operation of the MEC server may be implemented by the controller (720).

The memory (730) may store the control information or the data included in a signal obtained by the MEC server. The memory (730) may be connected to the controller (720) and store at least one instruction or a protocol or a parameter for the proposed function, process, and/or method.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method for a multi-access edge computing (MEC) service by a device application included in a user equipment (UE) in an MEC system, the method comprising:
   transmitting, to a user application lifecycle management proxy (UALCMP) within the MEC system, a first POST request to obtain a list of locations available for instantiation of a specific user application;
   receiving, from the UALCMP, a first response message including a list of available constrained locations for the specific user application;
   transmitting, to the UALCMP, a second POST request for an application context to be created; and
   receiving, from the UALCMP, a second response message including a created application context,
   wherein the second POST request includes an indication that instantiation of the requested application is desired in case that the constrained locations become available that wasn't at a time of the request.

2. The method of claim 1, wherein the second POST request is generated based on the list included in the first response message.

3. The method of claim 1,
   wherein the first POST request includes a callback reference address of the device application and a data structure pertinent to the specific user application, and
   wherein the second POST request includes an application context information.

4. The method of claim 1, further comprising:
   receiving, from the UALCMP, a first message including updated application context based on an application context information and the indication; and
   transmitting, to the UALCMP, a response to the first message.

5. The method of claim 1, further comprising:
   transmitting, to the UALCMP, a first message including application location constraints and a flag requesting to subscribe to a notification of change of application location constraint; and
   receiving, from the UALCMP, a response to the first message.

6. The method of claim 5, further comprising:
   receiving, from the UALCMP, a first message including updated application context based on a subscription; and
   transmitting, to the UALCMP, a response to the first message.

7. The method of claim 1, wherein a callback reference address includes a notification endpoint.

8. A method for providing a multi-access edge computing (MEC) service to a device application by a user application lifecycle management proxy (UALCMP) in a MEC system, the method comprising:
   receiving, from the device application included in a user equipment (UE), a first POST request to obtain a list of locations available for a specific user application, the first POST request including a data structure pertinent to the specific user application;
   authorizing the first POST request received from the device application;
   evaluating the list of locations for user application instantiation available requested from the device application through the MEC system;
   transmitting, to the device application, a first response message including a list of available constrained locations for the specific user application based on the evaluation result;
   receiving, from the device application, a second POST request for an application context to be created;
   authorizing the second POST request received from the device application;
   forwarding, to the MEC system, the second POST request; and
   transmitting, to the device application, a second response message including a created application context,
   wherein the second POST request includes an indication that instantiation of the requested application is desired in case that the constrained locations become available that wasn't at a time of the request.

9. The method of claim 8, wherein the second POST request includes an application context information.

10. The method of claim 8, further comprising:
transmitting, to the device application, a first message including updated application context based on an application context information and the indication; and
receiving, from the device application, a response to the first message.

11. The method of claim 8, further comprising:
receiving, from the device application, a first message including application location constraints and a flag requesting to subscribe to a notification of change of application location constraint; and
transmitting, to the device application, a response to the first message.

12. The method of claim 11, further comprising:
transmitting, to the device application, a first message including updated application context based on a subscription; and
receiving, from the device application, a response to the first message.

13. A user equipment (UE) for receiving a multi-access edge computing (MEC) service, the UE comprising:
a transceiver for communicating with an MEC system;
a memory; and
at least one processor configured to run a device application for receiving a service from the MEC system,
wherein the device application configured to control to:
transmit, to a user application lifecycle management proxy (UALCMP) within the MEC system, a first POST request to obtain a list of locations available for instantiation of a specific user application, and
receive, from the UALCMP, a first response message including a list of available constrained locations for the specific user application,
transmit, to the UALCMP, a second POST request for an application context to be created; and
receive, from the UALCMP, a second response message including a created application context,
wherein the second POST request includes an indication that instantiation of the requested application is desired in case that the constrained locations become available that wasn't at a time of the request.

14. The UE of claim 13, wherein the second POST request is generated based on the list included in the first response message.

15. The UE of claim 13, wherein the second POST request includes an application context information.

16. The UE of claim 15, wherein the device application further configured to control to:
receive, from the UALCMP, a first message including updated application context based on the application context information and the indication; and
transmit, to the UALCMP, a response to the first message.

17. The UE of claim 13, wherein the device application further configured to control to:
transmit, to the UALCMP, a first message including application location constraints and a flag requesting to subscribe to a notification of change of application location constraint; and
receive, from the UALCMP, a response to the first message.

18. The UE of claim 17, wherein the device application further configured to control to:
receive, from the UALCMP, a first message including updated application context based on a subscription; and
transmit, to the UALCMP, a response to the first message.

\* \* \* \* \*